(12) United States Patent
Telefus et al.

(10) Patent No.: US 9,019,726 B2
(45) Date of Patent: Apr. 28, 2015

(54) POWER CONVERTERS WITH QUASI-ZERO POWER CONSUMPTION

(75) Inventors: Mark Telefus, Orinda, CA (US); Bahman Sharifipour, Westford, MA (US)

(73) Assignee: Flextronics AP, LLC, Broomfield, CO (US)

( * ) Notice: Subject to any disclaimer, the term of this patent is extended or adjusted under 35 U.S.C. 154(b) by 394 days.

(21) Appl. No.: 13/549,301

(22) Filed: Jul. 13, 2012

(65) Prior Publication Data

US 2014/0016359 A1    Jan. 16, 2014

(51) Int. Cl.
| | |
|---|---|
| *H02M 3/335* | (2006.01) |
| *H02M 1/36* | (2007.01) |
| *H02J 9/00* | (2006.01) |
| *H02M 1/00* | (2006.01) |

(52) U.S. Cl.
CPC ............... *H02M 3/335* (2013.01); *H02M 1/36* (2013.01); *H02J 9/005* (2013.01); *H02M 2001/0035* (2013.01); *Y02B 70/16* (2013.01)

(58) Field of Classification Search
USPC ........................................... 363/21.12–21.18
See application file for complete search history.

(56) References Cited

U.S. PATENT DOCUMENTS

| | | |
|---|---|---|
| 4,273,406 A | 6/1981 | Okagami |
| 4,563,731 A | 1/1986 | Sato et al. |
| 4,645,278 A | 2/1987 | Yevak et al. |
| 4,712,160 A | 12/1987 | Sato et al. |
| 4,788,626 A | 11/1988 | Neidig et al. |
| 4,806,110 A | 2/1989 | Lindeman |
| 4,841,220 A | 6/1989 | Tabisz et al. |
| 4,857,822 A | 8/1989 | Tabisz et al. |
| 4,866,367 A | 9/1989 | Ridley et al. |
| 4,890,217 A | 12/1989 | Conway |
| 4,893,227 A | 1/1990 | Gallios et al. |
| 4,899,256 A | 2/1990 | Sway-Tin |
| 5,090,919 A | 2/1992 | Tsuji |
| 5,101,322 A | 3/1992 | Ghaem et al. |
| 5,132,890 A | 7/1992 | Blandino |
| 5,235,491 A | 8/1993 | Weiss |
| 5,365,403 A | 11/1994 | Vinciarelli et al. |
| 5,673,185 A | 9/1997 | Albach et al. |
| 5,712,772 A | 1/1998 | Telefus et al. |

(Continued)

FOREIGN PATENT DOCUMENTS

| | | | |
|---|---|---|---|
| JP | 4217869 A | 8/1992 | |
| JP | 10243640 A | 9/1998 | |

(Continued)

OTHER PUBLICATIONS

EE Times.com—"Team Claims Midrange Wireless Energy Transfer," by R. Colin Johnson, 4 pages, Nov. 6, 2007.

(Continued)

*Primary Examiner* — Jue Zhang
(74) *Attorney, Agent, or Firm* — Haverstock & Owens LLP

(57) ABSTRACT

A power converter system, method and device powers a load when coupled to the load and draws a quasi-zero amount of power from the power supply when not coupled to the load. The power converter system maintains an output voltage such that the power converter system is able to properly "wake-up" when a load is coupled by intermittently operating the power converter for a preselected number of cycles when it is detected that the output voltage has fallen below a threshold level.

21 Claims, 2 Drawing Sheets

(56) References Cited

U.S. PATENT DOCUMENTS

| | | | |
|---|---|---|---|
| 5,768,118 A | 6/1998 | Faulk et al. |
| 5,786,992 A | 7/1998 | Vinciarelli et al. |
| 5,790,395 A | 8/1998 | Hagen |
| 5,811,895 A | 9/1998 | Suzuki et al. |
| 5,838,554 A | 11/1998 | Lanni |
| 5,859,771 A | 1/1999 | Kniegl |
| 5,905,369 A | 5/1999 | Ishii et al. |
| 5,923,543 A | 7/1999 | Choi |
| 5,999,419 A | 12/1999 | Marrero |
| 6,009,008 A | 12/1999 | Pelly |
| 6,091,611 A | 7/2000 | Lanni |
| 6,183,302 B1 | 2/2001 | Daikuhara et al. |
| 6,191,957 B1 | 2/2001 | Peterson |
| 6,272,015 B1 | 8/2001 | Mangtani |
| 6,275,397 B1 | 8/2001 | McClain |
| 6,307,761 B1 | 10/2001 | Nakagawa |
| 6,323,627 B1 | 11/2001 | Schmiederer et al. |
| 6,385,059 B1 | 5/2002 | Telefus et al. |
| 6,388,897 B1 | 5/2002 | Ying et al. |
| 6,390,854 B2 | 5/2002 | Yamamoto et al. |
| 6,396,716 B1 | 5/2002 | Liu et al. |
| 6,459,175 B1 | 10/2002 | Potega |
| 6,487,098 B2 | 11/2002 | Malik et al. |
| 6,549,409 B1 | 4/2003 | Saxelby et al. |
| 6,650,552 B2 | 11/2003 | Takagi et al. |
| 6,721,192 B1 | 4/2004 | Yang et al. |
| 6,775,162 B2 | 8/2004 | Mihai et al. |
| 6,894,461 B1 | 5/2005 | Hack et al. |
| 6,919,715 B2 | 7/2005 | Muratov et al. |
| 7,035,126 B1 | 4/2006 | Lanni |
| 7,038,406 B2 | 5/2006 | Wilson |
| 7,061,195 B2 | 6/2006 | Ho et al. |
| 7,102,251 B2 | 9/2006 | West |
| 7,139,180 B1 | 11/2006 | Herbert |
| 7,202,640 B2 | 4/2007 | Morita |
| 7,205,752 B2 | 4/2007 | Jansen |
| 7,208,833 B2 | 4/2007 | Nobori et al. |
| 7,212,420 B2 | 5/2007 | Liao |
| 7,239,532 B1 | 7/2007 | Hsu et al. |
| 7,274,175 B2 | 9/2007 | Manolescu |
| 7,315,460 B2 | 1/2008 | Kyono |
| 7,386,286 B2 | 6/2008 | Petrovic et al. |
| 7,450,388 B2 | 11/2008 | Beihoff et al. |
| 7,459,893 B2 | 12/2008 | Jacobs |
| 7,499,301 B2 | 3/2009 | Zhou |
| 7,545,256 B2 | 6/2009 | O'Toole et al. |
| 7,564,706 B1 | 7/2009 | Herbert |
| 7,701,305 B2 | 4/2010 | Lin et al. |
| 7,730,676 B2 | 6/2010 | Hon |
| 7,755,914 B2 | 7/2010 | Telefus et al. |
| 7,760,519 B2 | 7/2010 | Telefus et al. |
| 7,904,738 B2 * | 3/2011 | DuBose ............... 713/300 |
| 7,924,578 B2 | 4/2011 | Jansen et al. |
| 7,952,895 B2 * | 5/2011 | Matthews ............. 363/21.15 |
| 7,978,489 B1 | 7/2011 | Telefus et al. |
| 8,040,117 B2 | 10/2011 | Telefus |
| 8,059,434 B2 | 11/2011 | Huang |
| 8,077,489 B2 | 12/2011 | Pellen |
| 8,102,678 B2 | 1/2012 | Jungreis |
| 8,125,181 B2 | 2/2012 | Gregg et al. |
| 8,126,181 B2 | 2/2012 | Yamamoto et al. |
| 8,134,848 B2 | 3/2012 | Whittam et al. |
| 8,155,368 B2 | 4/2012 | Cheung et al. |
| 8,194,417 B2 | 6/2012 | Chang |
| 8,207,717 B2 | 6/2012 | Urono et al. |
| 8,243,472 B2 | 8/2012 | Chang et al. |
| 8,279,646 B1 | 10/2012 | Hamstra |
| 8,289,741 B2 | 10/2012 | Jungreis |
| 8,344,689 B2 | 1/2013 | Boguslavskij |
| 8,369,111 B2 | 2/2013 | Balakrishnan et al. |
| 8,410,768 B2 | 4/2013 | Huber et al. |
| 8,441,810 B2 | 5/2013 | Telefus et al. |
| 8,488,340 B2 | 7/2013 | Zhang et al. |
| 8,520,410 B2 | 8/2013 | Telefus et al. |
| 8,743,565 B2 | 6/2014 | Telefus |
| 2002/0008963 A1 | 1/2002 | Dibene, II et al. |
| 2002/0011823 A1 | 1/2002 | Lee |
| 2002/0036200 A1 | 3/2002 | Ulrich et al. |
| 2003/0035303 A1 | 2/2003 | Balakrishnan et al. |
| 2003/0112645 A1 | 6/2003 | Schlecht |
| 2004/0062061 A1 | 4/2004 | Bourdillon et al. |
| 2004/0149551 A1 | 8/2004 | Porter |
| 2004/0183510 A1 | 9/2004 | Sutardja et al. |
| 2004/0252529 A1 | 12/2004 | Huber et al. |
| 2005/0024016 A1 | 2/2005 | Breen et al. |
| 2005/0036338 A1 | 2/2005 | Porter et al. |
| 2005/0117376 A1 | 6/2005 | Wilson |
| 2005/0138437 A1 | 6/2005 | Allen et al. |
| 2005/0194942 A1 | 9/2005 | Hack et al. |
| 2005/0225257 A1 | 10/2005 | Green |
| 2005/0254268 A1 | 11/2005 | Reinhard et al. |
| 2005/0270001 A1 | 12/2005 | Jitaru |
| 2006/0002155 A1 | 1/2006 | Syteynberg et al. |
| 2006/0022637 A1 | 2/2006 | Wang et al. |
| 2006/0152947 A1 | 7/2006 | Baker et al. |
| 2006/0232220 A1 | 10/2006 | Melis |
| 2007/0040516 A1 | 2/2007 | Chen |
| 2007/0087784 A1 | 4/2007 | Yamamoto et al. |
| 2007/0120542 A1 | 5/2007 | LeMay |
| 2007/0121981 A1 | 5/2007 | Koh et al. |
| 2007/0138971 A1 | 6/2007 | Chen |
| 2007/0247091 A1 | 10/2007 | Maiocchi |
| 2007/0263415 A1 | 11/2007 | Jansen et al. |
| 2007/0298653 A1 | 12/2007 | Mahoney et al. |
| 2008/0018265 A1 | 1/2008 | Lee et al. |
| 2008/0043496 A1 | 2/2008 | Yang |
| 2008/0191667 A1 | 8/2008 | Kernahan et al. |
| 2009/0034299 A1 | 2/2009 | Lev |
| 2009/0196073 A1 | 8/2009 | Nakahori |
| 2009/0290384 A1 | 11/2009 | Jungreis |
| 2009/0290385 A1 | 11/2009 | Jungreis et al. |
| 2010/0039833 A1 | 2/2010 | Coulson et al. |
| 2010/0110732 A1 | 5/2010 | Moyer |
| 2010/0195355 A1 * | 8/2010 | Zheng ............... 363/21.12 |
| 2010/0202161 A1 * | 8/2010 | Sims et al. ............... 363/20 |
| 2010/0289466 A1 | 11/2010 | Telefus et al. |
| 2010/0317216 A1 | 12/2010 | Pocrass |
| 2010/0322441 A1 | 12/2010 | Weiss et al. |
| 2011/0132899 A1 | 6/2011 | Shimomugi et al. |
| 2011/0261590 A1 | 10/2011 | Liu |
| 2012/0112657 A1 | 5/2012 | Van Der Veen et al. |
| 2013/0027011 A1 | 1/2013 | Shih et al. |
| 2013/0148385 A1 | 6/2013 | Zhang |

FOREIGN PATENT DOCUMENTS

| | | |
|---|---|---|
| JP | 2000083374 A | 3/2000 |
| JP | 2000253648 A | 9/2000 |
| JP | 2004208357 A | 7/2004 |

OTHER PUBLICATIONS

EE Times.com—"Wireless Beacon Could Recharge Consumer Devices," by R. Colin Johnson, 3 pages, Nov. 6, 2007.

Hang-Seok Choi et al. Novel Zero-Voltage and Zero-Current-Switching (ZVZCS) Full-Bridge PWM Converter Using Coupled Output Inductor, Sep. 2002 IEEE, pp. 641-648.

"New Architectures for Radio-Frequency dc/dc Power Conversion," Juan Rivas et al., Laboratory for Electromagnetic and Electronic Systems, Jan. 2004, Massachusetts Institute of Technology, Room 10-171 Cambridge, MA 02139, pp. 4074-4084.

"Randomized Modulation in Power Electronic Converters," Aleksander M. Stankovic, member IEEE, and Hanoch Lev-Ari, vol. 90, No. 5, May 2002, pp. 782-799.

"Analysis and Special Characteristics of a Spread-Spectrum Technique for Conducted EMI Suppression," K.K. Tse, et al. Member IEEE, IEEE Transactions on Power Electronics, vol. 15., No. 2, Mar. 2000, pp. 399-410.

International Search Report, PCT/US2011/49438, International Filing Date Aug. 26, 2011, 10 pages.

* cited by examiner

POWER CONVERTERS WITH QUASI-ZERO POWER CONSUMPTION

FIELD OF THE INVENTION

The present invention relates to the field of power supplies. More particularly, the present invention relates to a power converter system with a quasi-zero power consumption feature.

BACKGROUND

Previously, restrictions on power converter efficiency centered around the efficiency at which the power converter is able to transfer the power received from the mains to the load for consumption. Recently however, greater restrictions have been introduced centering on the efficiency of power converters when no load is present. In particular, this efficiently relates to how much power is consumed by chargers when the device to be charged is disconnected and when cell phones, set top boxes, laptops and other electronic devices are in standby or sleep modes. Thus far, this type of efficiency has been problematic to achieve because it is difficult to design a power converter that does not use much power when a load is not connected, but is able to properly "wake-up" and provide the needed power when a load is connected.

SUMMARY OF THE INVENTION

A power converter system, method and device powers a load when coupled to the load and draws a quasi-zero amount of power from the power supply when not coupled to the load. The power converter system maintains an output voltage such that the power converter system is able to properly "wake-up" when a load is coupled by intermittently operating the power converter for a preselected number of cycles when it is detected that the output voltage has fallen below a threshold level. The small ratio of operation time required to recharge the output voltage compared to the time required for the output voltage to decay enables the power converter system to operate according to an almost or quasi-zero duty cycle. As a result, the efficiency of the power converter when not connected to the load is maximized.

One aspect of the present invention is directed to a power converter system for powering a load when coupled to the load and for drawing a quasi-zero amount of power when not coupled to the load. The system comprises a power supply for supplying an input power, a power converter coupled with the power supply, wherein the power converter produces an output voltage from the input power and a wake-up element coupled to the power converting element, wherein when the load is disconnected from the power converter and the output voltage drops below a threshold voltage the wake-up element causes the power converter to recharge the output voltage to a predefined sleep voltage. The power converter is a switch mode power supply having a switching signal comprising one or more cycles, wherein the switching signal controls when input power is drawn from the power supply to produce the output voltage. In some embodiments, the wake-up element causes the power converter to recharge the output voltage to the predefined sleep voltage by causing the power converter to operate until the wake-up element detects that the output voltage equals the predefined sleep voltage. In some embodiments, the wake-up element causes the power converter to recharge the output voltage to the predefined sleep voltage by causing the power converter to operate for a predetermined number of the switching signal cycles. In some embodiments, the predefined sleep voltage equals the maximum operating voltage of the load and the threshold voltage equals the minimum operating voltage of the load. In some embodiments, the predetermined number of switching signal cycles equals the number of cycles required to maximize the ratio of the time that the output voltage takes to drop to the threshold voltage versus the combined period of the predetermined number of switching signal cycles. In some embodiments, the predetermined number of switching signal cycles equals the number of cycles required to minimize the duty cycle of the power converter while keeping the output voltage above the threshold voltage. In some embodiments, the predetermined number of switching signal cycles equals the minimum amount of cycles required to recharge the output voltage to the predefined sleep voltage. In some embodiments, the power converter and the wake-up element are a part of a single integrated circuit.

A second aspect of the present invention is directed to a power converter device for powering a load when coupled to the load and for drawing a quasi-zero amount of power when not coupled to the load. The device comprises a power converter configured to produce an output voltage from an input power and a wake-up element coupled to the power converter, wherein when the load is disconnected from the power converter and the output voltage drops below a threshold voltage the wake-up element causes the power converter to recharge the output voltage to a predefined sleep voltage. The power converter is a switch mode power supply having a switching signal comprising one or more cycles, wherein the switching signal controls when input power is drawn from the power supply to produce the output voltage. In some embodiments, the wake-up element causes the power converter to recharge the output voltage to the predefined sleep voltage by causing the power converter to operate until the wake-up element detects that the output voltage equals the predefined sleep voltage. In some embodiments, the wake-up element causes the power converter to recharge the output voltage to the predefined sleep voltage by causing the power converter to operate for a predetermined number of the switching signal cycles. In some embodiments, the predefined sleep voltage equals the maximum operating voltage of the load and the threshold voltage equals the minimum operating voltage of the load. In some embodiments, the predetermined number of switching signal cycles equals the number of cycles required to maximize the ratio of the time that the output voltage takes to drop to the threshold voltage versus the combined period of the predetermined number of switching signal cycles. In some embodiments, the predetermined number of switching signal cycles equals the number of cycles required to minimize the duty cycle of the power converter while keeping the output voltage above the threshold voltage. In some embodiments, the predetermined number of switching signal cycles equals the minimum amount of cycles required to recharge the output voltage to the predefined sleep voltage. In some embodiments, the power converter and the wake-up element are a part of a single integrated circuit.

Another aspect of the present invention is directed to a method of powering a load with a power supply when coupled to the load and for drawing a quasi-zero amount of power from the power supply when not coupled to the load. The method comprises detecting if the load is coupled with a power converter with a wake-up element, detecting an output voltage of the power converter with the wake-up element, transmitting a recharge signal from the wake-up element to the power converter if the load is not coupled with the power converter and the output voltage is below a threshold voltage and recharging the output voltage to a predefined sleep voltage with the power converter upon receiving the recharge signal. The power converter is a switch mode power supply having a switching signal comprising one or more cycles wherein the switching signal controls when input power is drawn from the power supply to produce the output voltage. In some embodiments, the recharging comprises operating the power converter until the wake-up element detects that the output voltage equals the predefined sleep voltage. In some embodiments, the recharging comprises operating the power converter for a predetermined number of the switching signal cycles. In some embodiments, the predefined sleep voltage equals the maximum operating voltage of the load and the threshold voltage equals the minimum operating voltage of the load. In some embodiments, the predetermined number of switching signal cycles equals the number of cycles required to maximize the ratio of the time that the output voltage takes to drop to the threshold voltage versus the combined period of the predetermined number of switching signal cycles. In some embodiments, the predetermined number of switching signal cycles equals the number of cycles required to minimize the duty cycle of the power converter while keeping the output voltage above the threshold voltage. In some embodiments, the predetermined number of switching signal cycles equals the minimum amount of cycles required to recharge the output voltage to the predefined sleep voltage. In some embodiments, the power converter and the wake-up element are a part of a single integrated circuit.

DETAILED DESCRIPTION

In the following description, numerous details and alternatives are set forth for the purpose of explanation. However, one of ordinary skill in the art will realize that the invention can be practiced without the use of these specific details. In other instances, well-known structures and devices are shown in block diagram form in order not to obscure the description of the invention with unnecessary detail.

Embodiments of a power converter system, device and method are described herein. The power converter system, device and method power a load when coupled to the load and draw a quasi-zero amount of power from the power supply when not coupled to the load. The power converter system maintains an output voltage such that the power converter system is able to properly "wake-up" when a load is coupled by intermittently operating the power converter for a preselected number of cycles when it is detected that the output voltage has fallen below a threshold level. The small ratio of operation time required to recharge the output voltage compared to the time required for the output voltage to decay enables the power converter system to operate according to an almost or quasi-zero duty cycle. As a result, the efficiency of the power converter when not connected to the load is maximized.

Figure 1:
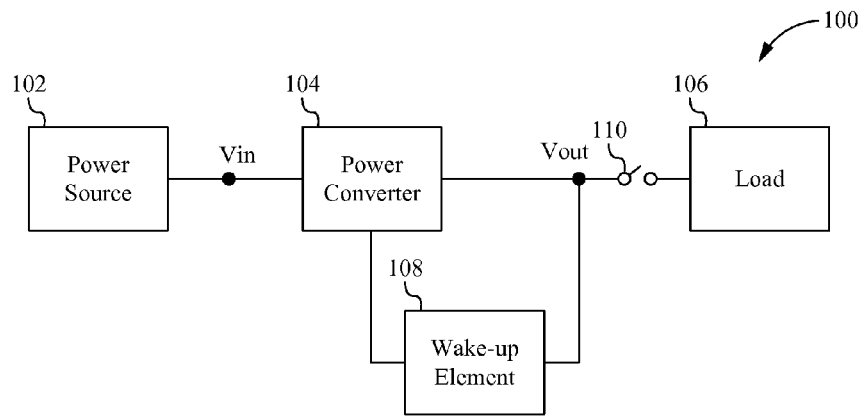
FIG. 1 illustrates a functional block diagram of a power converter system according to some embodiments.

FIG. 1 illustrates a functional block diagram of a power converter system 100 according to some embodiments. As shown in FIG. 1, the system 100 comprises a power source 102, a power converter 104, a load 106 and a wake-up element 108. The power source 102 is electrically coupled with the power converter 104 which is able to selectively couple or decouple with the load 106 at a coupling point 110. The wake-up element 108 is electrically coupled between the coupling point 110 and the power converter 104. In some embodiments, two or more of the power converter 104, wake-up element 108 and load 106 are integrated on a single integrated circuit. Alternatively, one or more of the power converter 104, wake-up element 108 and load 106 are able to be on separate integrated circuits.

The power source 102 is able to comprise an AC power source such as a main line or plug outlet. Alternatively, the power source 102 is able to comprise a DC power supply. The power converter 104 is able to comprise a power converter circuit, such as a flyback converter. Alternatively, the power converter 104 is able to comprise other types of circuits that include power converters as are well known in the art. For example, the power converter 104 is able to comprise a forward converter, a push-pull converter, a half-bridge converter, a full-bridge converter and/or other configurations of switch mode power supplies as are well known in the art. The wake-up element 108 is able to comprise a low power consuming voltage sensing circuit that is able to monitor the output voltage $V_{out}$, and the coupling status of the load 106 and control the operation of the power converter 104 accordingly. The load 106 is able to comprise a mobile phone, laptop, set top box, television or other type of electronic device. The coupling point 110 is able to be a physical coupling point and/or an electronic coupling point. Specifically, in some embodiments the coupling point 110 is a physical coupling point wherein, for example, the load 106 is a cell phone and the power converter 104 and wake-up element 108 comprise a cell phone charger such that the load 106 and the converter 104 are physically coupled and decoupled as the cell phone is coupled and decoupled from the charger. Alternatively, in some embodiments the coupling point 110 is an electronic coupling point wherein, for example, the load 106, the power converter 104 and wake-up element 108 all comprise parts of a laptop computer such that the load 106 and the converter 104 are electronically coupled and decoupled as the laptop is put into and out of a sleep/hibernation mode.

In operation, the power converter 104 draws power from the power source 102 and produces an output voltage $V_{out}$ that is able to be used to power the load 106 when the load 106 is coupled to the power converter 104. The wake-up element 108 monitors whether the load 106 is coupled to the power converter 104 and the output voltage $V_{out}$. If the wake-up element 108 detects that the load 106 is not coupled to the power converter 104 and the output voltage $V_{out}$ is within a desired range or above a predetermined threshold voltage level, the wake-up element 108 interrupts or stops the normal operation of the power converter 104 in order to prevent the converter 104 from drawing power from the power source. If the wake-up element 108 detects that the load 106 is not coupled to the power converter 104 and the output voltage $V_{out}$ is outside the desired range or below the predetermined threshold voltage level, the wake-up element 108 stops interrupting the operation of the power converter 104 and causes the power converter 104 to run in order to recharge the voltage $V_{out}$ within the desired range and/or above the predetermined threshold. In some embodiments, the wake-up element 108 monitors the value of the output voltage $V_{out}$ while causing the power converter 104 to recharge the output voltage $V_{out}$ and stops the power converter 104 from the recharging as soon as the value of the output voltage $V_{out}$ reaches a desired wake-up voltage value. Alternatively, the wake-up element 108 is able to be configured to cause the power converter 104 to recharge the output voltage $V_{out}$ for a predetermined wake-up period and to stop the power converter 104 after the wake-up period has elapsed. In particular, the wake-up period is able to be a number of pulse cycles that will result in increasing the value of the output voltage $V_{out}$ a desired voltage amount or to a desired voltage level. Alternatively, the wake-up period is able to be a different length of time. As a result, the system 100 is able to minimize the amount of power consumed from the power source 102 by the power converter 104 when the load 106 is not coupled with the power converter 104. Indeed, because the time required to recharge the output voltage $V_{out}$ is generally orders of magnitude shorter than the time it takes that added voltage to decay from the output voltage $V_{out}$, the duty cycle of the power converter 104 (e.g. the time the converter 104 is operating compared to the time the converter 104 is not operating) approaches zero. Thus, the system 100 provides the benefit of increased power saving efficiency in no load conditions.

Figure 2:
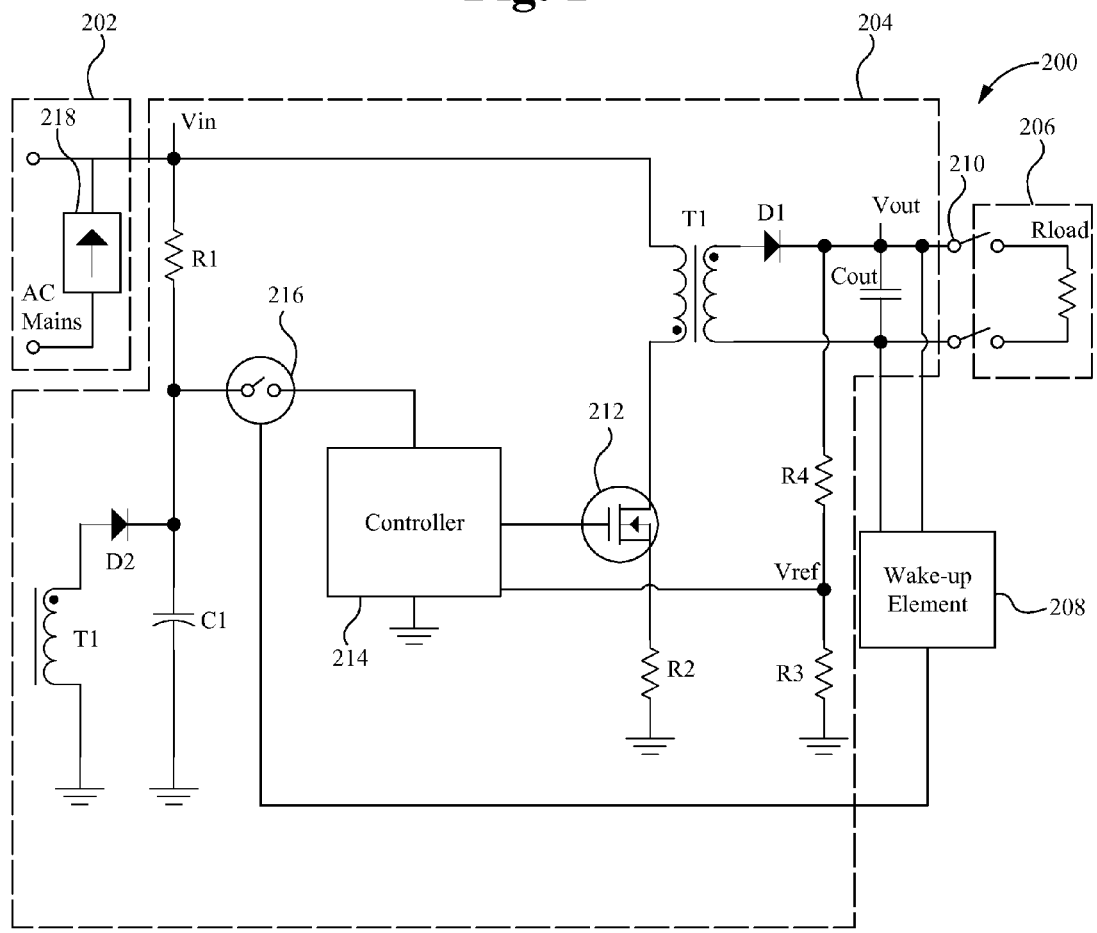
FIG. 2 illustrates a circuit diagram of a power converter system according to some embodiments.

FIG. 2 illustrates a schematic diagram of a power converter system 200 according to some embodiments. The schematic diagram is substantially similar to the functional block diagram shown in FIG. 1 except the additional details described herein. However, it is understood that alternative schematics are able to be used to implement the functional blocks of FIG. 2. As shown in FIG. 2, the power converter system 200 comprises a power source 202, a power converter 204 having a coupling point 210, a load 206 and a wake-up element 208. In some embodiments, the system 200 is contained on a single integrated circuit. Alternatively, one or more of the components of the system 200 are able to be separate integrated circuits such that the system 200 is formed by multiple integrated circuits electrically coupled together.

The power source 202 comprises an AC mains power signal that is electrically coupled with a rectifier 218 in order to produce a DC input voltage Vin that is electrically coupled to the power converter 204. The load 206 comprises a resistor $R_{load}$ that represents the resistance provided by the load 206. In particular, it is understood that the load 206 is able to comprise numerous different combination of circuitry that are able to be represented by the resistance of the resistor $R_{load}$, the details of which are omitted for the sake of brevity. The wake-up element 208 comprises a wake-up circuit that is able to detect the output voltage $V_{out}$ and the coupling status of the load 206 while consuming a minimal amount of power. The power converter 204 comprises a transformer T1, a transistor 212, one or more resistors R1, R2, R3, R4, a controller device 214, one or more capacitors C1, $C_{out}$, one or more diodes D1, D2 and a power saving element 216. It is understood however, that one or more of the components of the power source 202, the power converter 204, the load 206 and/or the wake-up element 208 are able to be positioned or duplicated on one or more of the other elements 202-210.

A primary end of the transformer T1 is electrically coupled between the input voltage Vin received from the power source 202 and the drain terminal of the transistor 212 whose gate terminal is electrically coupled with the controller 214 and source terminal is electrically coupled with ground via the resistor R2. This enables the controller 214 to draw power into the transformer T1 by outputting a transistor control signal to the gate terminal of the transistor 212. One of the secondary ends of the transformer T1 is electrically coupled across the diode D1 and capacitor $C_{out}$ to the coupling point 210 and a second of the secondary ends of the transformer T1 is electrically coupled between ground and the controller 214 via the diode D2 and the power saving element 216. Further, the power saving element 216 is coupled with the input voltage Vin and ground via the resistor R1 and the capacitor C1, respectively. As a result, the power drawn into the primary end of the transformer T1 is able to be transferred to the capacitor $C_{out}$ at the coupling point 210 via the first secondary end as well as recycled into the capacitor C1 and the controller 214 via the second secondary end. The controller 214 is electrically coupled with a reference voltage Vref at a node between the resistor R3 and ground, and the resistor R4 and the output voltage $V_{out}$. The wake-up element 208 is electrically coupled across the output capacitor $C_{out}$ and the coupling point 210 in order to detect the output voltage $V_{out}$ and whether the load 206 is coupled to the power converter 204. The wake-up element 208 is also electrically coupled with the power saving element 216 in order to control the power saving element 216.

In some embodiments, the transformer T1 is a flyback transformer. Alternatively, the transformer T1 is able to be other types of transformers or load isolating circuitry as are well known in the art. In some embodiments, the transistor 212 is a field effect transistor such as a n-type metal-oxide-semiconductor field-effect transistor (MOSFET). Alternatively, the transistor 212 is able to be other types of transistors or switching circuitry as are well known in the art. In some embodiments, the controller device 214 is a SR-NOR latch flip flop. Alternatively, the controller 214 is able to be other types of flip flops, pulse width modulation circuits or signal logic circuitry able to regulate the duty cycle or operation of the transistor 212 as are well known in the art. In some embodiments, the power saving element 216 comprises an electrically controlled switch. Alternatively, the power saving element 216 is able to comprise other types of electric selectively isolating components or combinations of components as are well known in the art. In some embodiments, the size of the output capacitor $C_{out}$ is selected based on charge decay time such that the length of the decay period between a starting voltage and the threshold voltage is maximized. Alternatively, any size output capacitor $C_{out}$ is able to be used.

In operation, when the load 206 is coupled to the power converter 204, the controller 214 of the power converter 204 outputs a transistor control signal having one or more pulse cycles to the gate terminal of the transistor 212 that causes the transistor 212 to repeatedly turn on and off as the pulse cycles alternate between high and low states. As a result, power from the power source 202 is alternately drawn into the transformer T1 and discharged to the output capacitor $C_{out}$ such that the output capacitor $C_{out}$ is charged to an output voltage $V_{out}$ that is supplied to the load 206. A portion of the power is discharged to the capacitor C1 and the controller 214 via the power saving element 216. This portion of the power is able to be used/recycled by the controller 214 in order to continue to output the transistor control signal.

Concurrently, the wake-up element 208 monitors the output voltage $V_{out}$ on the output capacitor $C_{out}$ and the load 206 connection status. If the wake-up element 208 detects that the load 206 is coupled with the power converter 204, the wake-up element 208 transmits a command signal to the energy saving element 216 that causes the energy saving element 216 to keep the input voltage Vin, the transformer T1 and the capacitor C1 coupled to the controller 214 such that the controller 214 is able to operate normally. Alternatively, the energy saving element 216 is able to be omitted or able to keep the input voltage Vin, the transformer T1 and the capacitor C1 coupled to the controller 214 by default such that the command signal from the wake-up element 208 is able to be omitted. If the wake-up element 208 detects that the load 206 is not coupled with the power converter 204 and the output voltage $V_{out}$ is above a threshold voltage or within a desired range, the wake-up element 208 transmits a command signal to the power saving element 216 that causes the power saving element 216 to disconnect or otherwise prevent the input voltage Vin, the transformer T1 and the capacitor C1 from communicating with the controller 214 such that the normal operation of the controller 214 is stopped. Alternatively, the wake-up element 208 is able to directly couple and send the command signal to the controller 214 such that although the input voltage Vin, the transformer T1 and the capacitor C1 remain coupled with the controller 214, they are able to be disregarded by the controller 214 based on the commands received from the wake-up element 208 and the controller 214 is prevented from wasting power. In some such embodiments, the power saving element 216 is able to be incorporated into the controller 214 or omitted. In some embodiments, the desired range is able to be based on the load 206 and the threshold voltage is able to be the minimum voltage that the load 206 is able to receive upon recoupling to the power converter 204 without resulting in an error. This prevents the controller 214 from wasting power by continually attempting to recharge the output voltage $V_{out}$. In particular, because the output capacitor $C_{out}$ acts like a battery when the load 206 is decoupled, the output voltage $V_{out}$ on the capacitor $C_{out}$ takes up to hundreds of milliseconds to decay tenths of a volt. As a result, the recharging of the output voltage $V_{out}$ is able to be delayed for hundreds of milliseconds without the output voltage $V_{out}$ falling to too low a value to properly recover when the load 206 is recoupled.

If the wake-up element 208 detects that the load 206 is not coupled with the power converter 204 and the output voltage $V_{out}$ is below the threshold voltage or outside the desired range, the wake-up element 208 transmits a command signal to the energy saving element 216 that causes the energy saving element 216 to reconnect or otherwise ensure the input voltage Vin, the transformer T1 and the capacitor C1 are coupled with the controller 214 such that the controller begins 214 to operate for a period of time. Specifically, the command signal of the wake-up element 208 controls the energy saving element 216 such that the controller 214 only outputs a desired number of cycles of the switch command signal to the transistor 212 before the input voltage Vin, the transformer T1 and the capacitor C1 are again decoupled from the controller 214. In some embodiments, the desired number of cycles is a predetermined number such as three cycles. Alternatively, the desired number of cycles is able to be determined dynamically by the wake-up element 208 by monitoring the output voltage $V_{out}$ as the controller 214 operates and stopping the operation of the controller 214 when the output voltage $V_{out}$ is at a desired level or within a desired range. Alternatively, the wake-up element 208 is able to be directly coupled to the controller 214 and the wake-up element 208 is able to transmit the command signal directly to the controller 214 to cause the controller 214 to operate for the desired number of cycles while the input voltage Vin, the transformer T1 and the capacitor C1 remain disconnected by the energy saving element 216. In any case, this operation is able to continue in order to maintain the output voltage $V_{out}$ at the desired level until the load 206 is recoupled to the coupling point 210. As a result, the system 200 is able to provide the advantage of only drawing minimal amount of power from the power source 202 necessary to recharge the output voltage $V_{out}$ to the desired level. In particular, the cumulative period of the number of cycles required to recharge the output voltage $V_{out}$ on the output capacitor $C_{out}$ is able to be only tens of microseconds. Thus, when compared to the decay time of the output voltage $V_{out}$, for every tens of microseconds of operation the power converter 204 is able to be off for hundreds of milliseconds. Consequently, the system 200 provides the advantage of consuming quasi-zero power from the power source 202 when operating in no-load conditions.

Figure 3:
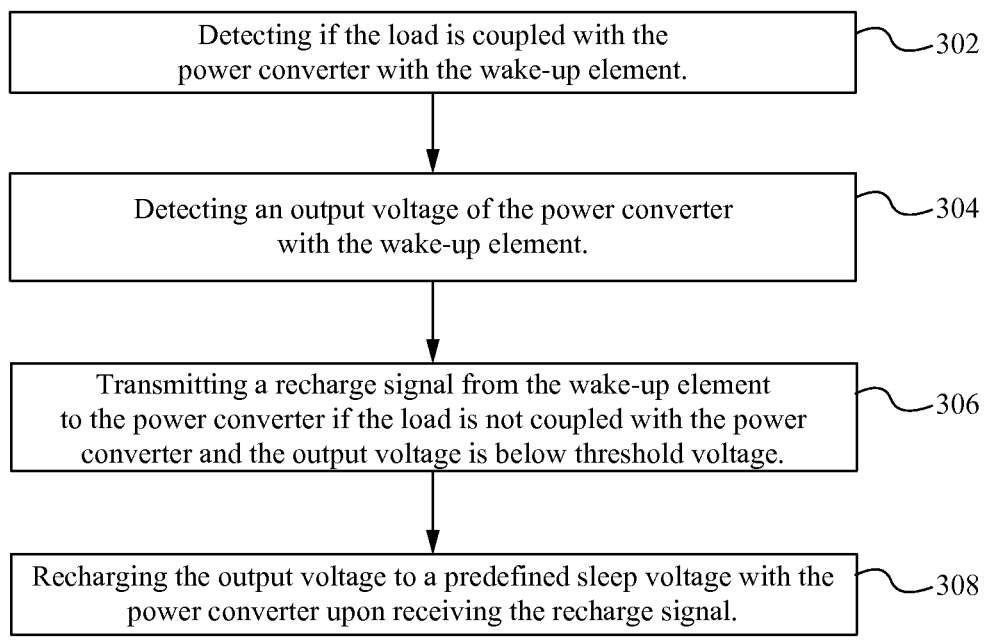
FIG. 3 illustrates a flowchart of a method of powering a load with a power supply when coupled to the load and for drawing a quasi-zero amount of power from the power supply when not coupled to the load according to some embodiments.

FIG. 3 illustrates a flow chart of a method of powering a load with a power supply when coupled to the load and for drawing a quasi-zero amount of power from the power supply when not coupled to the load according to some embodiments. At the step 302, the wake-up element 208 detects if the load 206 is coupled with the power converter 204. At the step 304, the wake-up element 208 detects the output voltage $V_{out}$ of the power converter 204. At the step 306, the wake-up element 208 transmits a recharge signal to the power converter 204 if the load 206 is not coupled with the power converter 204 and the output voltage $V_{out}$ is below a threshold voltage. At the step 308, the power converter 204 recharges the output voltage $V_{out}$ to a predefined sleep voltage upon receiving the recharge signal. In some embodiments, the power converter 204 recharges the output voltage $V_{out}$ by operating until the wake-up element 208 detects that the output voltage $V_{out}$ equals the predefined sleep voltage. In some embodiments, the power converter 204 recharges the output voltage $V_{out}$ by operating for a predetermined number of the switch command signal cycles. For example, in some embodiments, the power converter 204 operates for three cycles of 5 microseconds each in order to recharge the output voltage $V_{out}$ from 4.75 volts to 5 volts. In some embodiments, the predefined sleep voltage equals the maximum operating voltage of the load 206 and the threshold voltage equals the minimum operating voltage of the load 206. In some embodiments, the number of switching cycles that the converter 204 operates for is adjusted in order to maximize the ratio of the time that the output voltage $V_{out}$ takes to drop to the threshold voltage versus the combined period of the predetermined number of switching cycles. As a result, the method provides the benefit of consuming quasi-zero power from the power supply 202 when the power converter 204 is not coupled with the load 206.

The method, apparatus and system of power converter quasi-zero power consumption in a no load state described herein has many advantages. Specifically, the system prevents the power converter from drawing unnecessary power from the power source when the load is not coupled to the converter and the output voltage does not require recharging, thereby reducing power consumption. Similarly, the system ensures that the minimum amount of power is drawn from the power source in order to recharge the output voltage when the load is not coupled to the converter and the output voltage falls below a minimum voltage threshold value. Accordingly, the power converter with quasi-zero no load power consumption described herein has numerous advantages.

The power converter system has been described in terms of specific embodiments incorporating details to facilitate the understanding of the principles of construction and operation of the power converter system. The specific configurations shown and the methodologies described in relation to the various modules and the interconnections therebetween are for exemplary purposes only. Such reference herein to specific embodiments and details thereof is not intended to limit the scope of the claims appended hereto. It will be apparent to those skilled in the art that modifications may be made in the embodiments chosen for illustration without departing from the spirit and scope of the power converter system.

What is claimed is:

1. A power converter system for powering a load when coupled to the load and for drawing a quasi-zero amount of power when not coupled to the load, the system comprising:

a. a power supply for supplying an input power;
b. a power converter coupled with the power supply, wherein the power converter produces an output voltage from the input power; and
c. a wake-up element coupled to the power converter, wherein when the load is disconnected from the power converter and the output voltage drops below a threshold voltage, the wake-up element causes the power converter to recharge the output voltage to a predefined sleep voltage by causing the power converter to operate for a predetermined number of the switching signal cycles, wherein the predetermined number of switching signal cycles equals the number of cycles required to maximize the ratio of the time that the output voltage takes to drop to the threshold voltage versus the combined period of the predetermined number of switching signal cycles.

2. The system of claim 1, wherein the power converter is a switch mode power supply having a switching signal comprising one or more cycles, wherein the switching signal controls when input power is drawn from the power supply to produce the output voltage.

3. The system of claim 2, wherein the wake-up element causes the power converter to recharge the output voltage to the predefined sleep voltage by causing the power converter to operate until the wake-up element detects that the output voltage equals the predefined sleep voltage.

4. The system of claim 1, wherein the predefined sleep voltage equals the maximum operating voltage of the load and the threshold voltage equals the minimum operating voltage of the load.

5. The system of claim 1, wherein the predetermined number of switching signal cycles equals the number of cycles required to minimize the duty cycle of the power converter while keeping the output voltage above the threshold voltage.

6. The system of claim 1, wherein the predetermined number of switching signal cycles equals the minimum amount of cycles required to recharge the output voltage to the predefined sleep voltage.

7. The system of claim 1, wherein the power converter and the wake-up element are a part of a single integrated circuit.

8. A power converter device for powering a load when coupled to the load and for drawing a quasi-zero amount of power when not coupled to the load, the device comprising:
a. a power converter configured to produce an output voltage from an input power; and
b. a wake-up element coupled to the power converter, wherein when the load is disconnected from the power converter and the output voltage drops below a threshold voltage, the wake-up element causes the power converter to recharge the output voltage to a predefined sleep voltage by causing the power converter to operate for a predetermined number of the switching signal cycles, wherein the predetermined number of switching signal cycles equals the number of cycles required to maximize the ratio of the time that the output voltage takes to drop to the threshold voltage versus the combined period of the predetermined number of switching signal cycles.

9. The device of claim 8, wherein the power converter is a switch mode power supply having a switching signal comprising one or more cycles, wherein the switching signal controls when input power is drawn from the power supply to produce the output voltage.

10. The device of claim 9, wherein the wake-up element causes the power converter to recharge the output voltage to the predefined sleep voltage by causing the power converter to operate until the wake-up element detects that the output voltage equals the predefined sleep voltage.

11. The device of claim 8, wherein the predefined sleep voltage equals the maximum operating voltage of the load and the threshold voltage equals the minimum operating voltage of the load.

12. The device of claim 8, wherein the predetermined number of switching signal cycles equals the number of cycles required to minimize the duty cycle of the power converter while keeping the output voltage above the threshold voltage.

13. The device of claim 8, wherein the predetermined number of switching signal cycles equals the minimum amount of cycles required to recharge the output voltage to the predefined sleep voltage.

14. The device of claim 8, wherein the power converter and the wake-up element are a part of a single integrated circuit.

15. A method of powering a load with a power supply when coupled to the load and for drawing a quasi-zero amount of power from the power supply when not coupled to the load, the method comprising:
a. detecting if the load is coupled with a power converter with a wake-up element;
b. detecting an output voltage of the power converter with the wake-up element;
c. transmitting a recharge signal from the wake-up element to the power converter if the load is not coupled with the power converter and the output voltage is below a threshold voltage; and
d. recharging the output voltage to a predefined sleep voltage with the power converter upon receiving the recharge signal, wherein the recharging comprises operating the power converter for a predetermined number of the switching signal cycles, wherein the predetermined number of switching signal cycles equals the number of cycles required to maximize the ratio of the time that the output voltage takes to drop to the threshold voltage versus the combined period of the predetermined number of switching signal cycles.

16. The method of claim 15, wherein the power converter is a switch mode power supply having a switching signal comprising one or more cycles wherein the switching signal controls when input power is drawn from the power supply to produce the output voltage.

17. The method of claim 16, wherein the recharging comprises operating the power converter until the wake-up element detects that the output voltage equals the predefined sleep voltage.

18. The method of claim 15, wherein the predefined sleep voltage equals the maximum operating voltage of the load and the threshold voltage equals the minimum operating voltage of the load.

19. The method of claim 15, wherein the predetermined number of switching signal cycles equals the number of cycles required to minimize the duty cycle of the power converter while keeping the output voltage above the threshold voltage.

20. The method of claim 15, wherein the predetermined number of switching signal cycles equals the minimum amount of cycles required to recharge the output voltage to the predefined sleep voltage.

21. The method of claim 15, wherein the power converter and the wake-up element are a part of a single integrated circuit.

* * * * *